United States Patent [19]
Bishop et al.

[11] Patent Number: 5,539,875
[45] Date of Patent: Jul. 23, 1996

[54] ERROR WINDOWING FOR STORAGE SUBSYSTEM RECOVERY

[75] Inventors: James W. Bishop; Mark L. Ciacelli, both of Endicott, N.Y.; Patrick W. Gallagher, Rochester, Minn.; Stefan P. Jackowski, Endicott, N.Y.; Gregory R. Klouda, Endwell, N.Y.; Robert D. Siegl, Endicott, N.Y.

[73] Assignee: International Business Machines Corporation, Armonk, N.Y.

[21] Appl. No.: 367,389

[22] Filed: Dec. 30, 1994

[51] Int. Cl.⁶ .......................... G01R 31/28; G06F 11/00
[52] U.S. Cl. .......................... 395/182.1; 371/47.1
[58] Field of Search .......................... 395/182.1, 182.22; 371/47.1

[56] References Cited

U.S. PATENT DOCUMENTS 4,974,147  11/1990  Hanrahan .......................... 395/182.22
5,056,091  10/1991  Hunt .......................... 395/182.22 X
5,255,367  10/1993  Bruckert .......................... 395/182.1 X
5,317,726  5/1994  Horst .......................... 395/182.1
5,331,673  7/1994  Elko .......................... 395/575
5,398,331  3/1995  Huang .......................... 395/182.1

*Primary Examiner*—Robert W. Beausoliel, Jr.
*Assistant Examiner*—Glenn Snyder
*Attorney, Agent, or Firm*—Baker, Maxham, Jester & Meador

[57] ABSTRACT

In a hierarchical, multi-level storage system, recovery from intermittent storage hardware failures is supported by establishing hardware checkpoints at storage system interfaces and by duplication of subsystem hardware within units of the storage system. When error is detected at an interface, all levels of the storage system are quiesced and backed up to a point preceding the occurrence of the error. If a hardware failure causes an error, the system is quiesced while the failed hardware is reconfigured with control logic copied from duplicate hardware. A single restart command restarts system operation.

4 Claims, 8 Drawing Sheets

ERROR WINDOWING FOR STORAGE SUBSYSTEM RECOVERY

CROSS-REFERENCE TO RELATED PATENT APPLICATIONS

The disclosed invention relates to material in the following patent applications:

1. U.S. patent application Ser. No. 8/123,495, filed Sep. 17, 1993 for "Computer Cache System", J. W. Bishop, et al.; and
2. U.S. patent application Ser. No. 08/241,910, filed May 12, 1994, for "Hierarchical Computer Cache System", J. W. Bishop, et al.

Both applications are commonly assigned with this patent application and both are incorporated in their entirety by this reference.

BACKGROUND OF THE INVENTION

The invention relates generally to computer systems, and deals more particularly with error recovery in a hierarchical storage system.

Hierarchical storage systems are known for storing information in computer systems. Typically, a hierarchical storage system includes a number of levels in which, for any adjacent levels, one level is subordinate to the other.

For example, the incorporated patent applications describe a computer system with multiple CPUs, main memory and direct access storage, and a cache system interposed between the multiple processors on the one hand and the main memory and direct access storage on the other hand. Each processor is served by a respective one of a plurality of first level (L1) cache subsystems for storing data or instructions. All L1 subsystems are coupled to a higher level (L2) cache subsystem containing data or instructions for the plurality L1 of cache subsystems. Main memory (level 3, or L3) and direct access storage are coupled to the L2 cache subsystem through a storage controller (SC).

The trend toward multi-processing in modern computer systems and the need for reliability and availability of parallel processors have placed substantial demands on hierarchical storage systems. In order to enhance reliability and availability, many multi-processor designs include instruction-level retry to recover from sporadic, intermittent hardware failures. With the unremitting evolution of modern computer technology driving more and more circuits into smaller and smaller configurations, processor designs are becoming increasingly complex. In addition, pipelining and parallel operations are provided to improve processor performance, at the cost of increasing the complexity of normal instruction execution sequences. This increased functional complexity makes instruction retry extraordinarily difficult, particularly in a hierarchical storage system where storage subsystem levels are used in common by multiple independent processors or by multiple concurrent operations, or by both.

One proposed technique for identifying and recovering from hardware errors in pipelined processing computer systems is taught in U.S. Pat. No. 4,924,466, commonly assigned with this application, and incorporated herein by reference. In the '466 patent, a multi-processing, pipelined computer system with a hierarchical multi-level storage system is partitioned into retry domains. Each retry domain comprises hardware devices and a trace array. The trace array is a record of the execution of a sequence of events that provides a history of an operation occurring in a retry domain. When an error is detected, the storage system is quiesced. In this regard, "quiescing" refers to the process of bringing processing to a halt by rejecting new requests for command execution. Following quiescence of the storage system, recovery is conducted by a service processor (SP). In the incorporated '466 patent, the trace arrays form a hierarchical structure with entries that are linked by an event trace ID. Such linking underpins recovery of the linked retry domains by cooperative operation of the domains.

The prior art does not provide the ability to separately and independently quiesce the operations of respective levels of a hierarchical storage system at respective checkpoints at which information about the status of operations in each of the respective levels is available to recover and restart each level. It would be advantageous to restart all quiesced levels in response to a single, system-wide restart command that ensures synchronous restart of all components within a level and synchronous restart of all levels.

SUMMARY OF THE INVENTION

In the invention, a hierarchical storage system includes a plurality of levels. Each level may comprise one or more units. Each unit includes a plurality of storage subsystems. The storage subsystems in the preferred embodiment are in the form of separate integrated circuit chips which operate in parallel to receive and store data. In any unit, each chip of the plurality of chips in the unit receives from a source only a portion of the data transferred between levels, but receives all control information, including commands. Thus, the control information is repeated for each chip. A trace array is maintained for each chip. The trace array indicates which commands have been completed with error and which without error. If an error is detected anywhere in the storage system, it is broadcast to all chips at each level. For each chip of the plurality of chips in any unit, an error windowing function is provided that identifies commands that are currently being processed in the unit and enables the chip to set error flags for each of those commands in the trace array for the chip. This provides checkpoint information for each unit that enables the unit to restart without reference to another unit.

When an error is detected at any one of the units, it is broadcast to all chips within a level and is promulgated to at least one adjacent unit. A support processor, in response to detection of an error in the storage system reads each of the trace arrays in each unit and determines which chip or interface contains an error. If the error is in the control information of a chip, the support processor corrects the chip with the error by obtaining correct control information from one of the other chips in the unit. If the error occurs in an interface between storage system units, the support processor, using the trace arrays, backs each unit to a point prior to where the error occurred. Each quiesced unit is ready to receive, across an error-propagating interface, a retransmission of one or more commands that were being transferred when the error occurred. The support processor then issues the single system-wide restart command, causing each unit to restart operations with intra-level synchronicity and with synchronism between all levels.

DETAILED DESCRIPTION OF THE PREFERRED EMBODIMENTS

Figure 1:
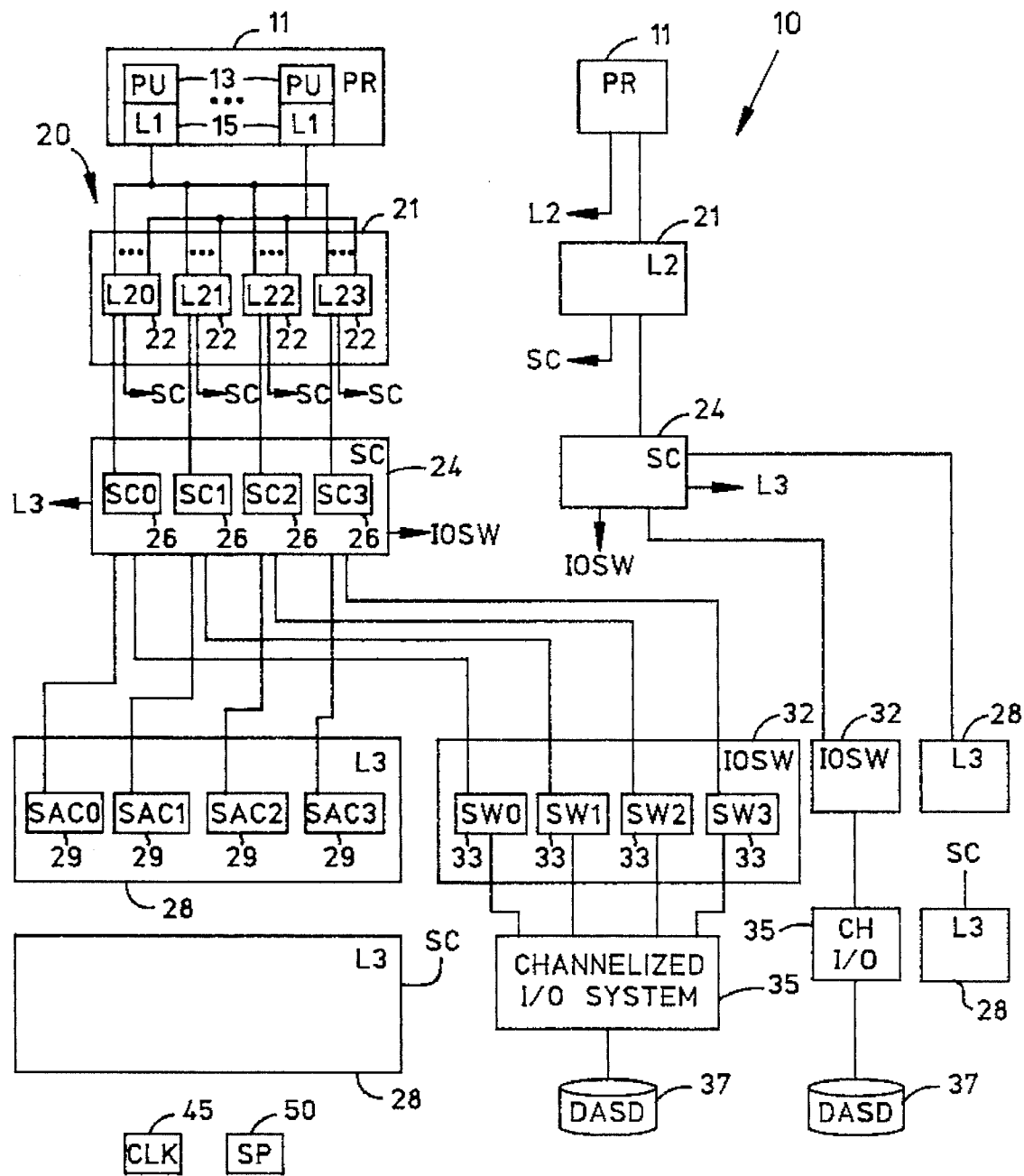
FIG. 1 is a block diagram of a multi-processor computer system that includes a hierarchical, multi-level storage system according to the present invention.

Referring to the figures in detail wherein like reference numerals indicate like elements throughout the several views, FIG. 1 illustrates a computer system 10 including one or more multi-processors 11, each including a plurality of processor units (PU) such as the processor units 13 shown in the left-hand multi-processor 11. Conventionally, a multi-processor is a computer including two or more processing units that can access a common main storage. An example of a multi-processor is the IBM System S390, programmed with an appropriate operating system such as MVS, VM, or VSE. Each processing unit 13 has its own respective level-1 (L1) cache subsystem 15. The storage system 20 includes a hierarchical, multi-level structure including one or more level-2 (L2) cache units 21, and one or more storage controller units (SC) 24 that provide access to higher memory levels including one or more level-3 (L3) main memory units 28 and direct access storage (DASD) 37 by way of an input/output switch unit (IOSW) 32 through a channelized I/O system 35. The cache subsystems are as described in the incorporated U.S. patent application Ser. No. 08/241,910 ("the '910 application").

Each multi-processor 11 is coupled to a respective one of the L2 cache units 21. Each L2 cache unit 21 is coupled to a respective SC unit 24, and cross-coupled to the other SC unit 24. To provide any PU with complete access to all units of the hierarchical, multi-level storage system 20, each SC unit 24 is coupled to a respective IOSW unit 32 and cross-coupled to the other IOSW unit 32.

The computer system architecture of FIG. 1 permits any processing unit 13 to access, through its own private L1 cache 15, data or instructions residing at any level of the hierarchical, multi-level storage system 20.

The operations of the computer system 10 in FIG. 1 are synchronized by a system clock (CLK) 45. The computer system 10 also includes a service processor (SP) 50.

Each of the units 21, 24, 28 and 32 of the hierarchical, multi-level storage system 20 is divided into a plurality of storage processing subsystems. In the preferred embodiment, each subsystem is embodied in respective integrated circuit and therefore may also be called a "chip." In the following description the chips of a unit are grouped for cooperative operation and are also referred to as "chipsets".

As shown in FIG. 1, the L2 cache unit 21 is subdivided into four storage processing subsystems 22, which are designated also as the L20, L21, L22, and L23 chips, respectively. These four chips form a chipset. In the SC unit 24, there are four storage processing subsystems 26, designated respectively as the SC0, SC1, SC2, and SC3 chips. Each L3 main memory unit includes four storage processing subsystems 29, designated in FIG. 1 as the SAC0, SAC1, SAC2, and SAC3 chips. Each of the IOSW units 32 has four storage processing subsystems 33: the SW0, SW1, SW2, and SW3 chips.

The multi-subsystem architecture of the storage elements is intended to accommodate a 16-byte wide data transfer across each interface between storage levels in the storage system, with each storage processing subsystem handling a respective four bytes of data. However, command interfaces are identical in that each chip in each chipset is provided with a complete copy of each command transferred across an interface to its unit. Thus, a fetch, store, or control command from one of the processing units 13 will result in the corresponding command and address being transferred to each of four chips in an L2 cache unit 21. The invention takes advantage of this duplication to establish a checkpoint for chip failure during command processing in the storage system element by inspecting four copies of the same command, discerning an incorrect copy, and correcting that copy with reference to the three valid copies in the storage system unit.

The same physical interface, comprising control and data lines is used to transfer commands/addresses and data, with the control lines determining whether data or command/address information is being transferred.

The invention further takes advantage of the linking of storage system elements at hardware interfaces, such as the interface between the L2 cache unit 21 and the SC unit 24. These interfaces are where the invention establishes interface checkpoints. Commands, addresses, data and other information are transferred across these interfaces as described below.

The precise structures and operations performed by the storage processing subsystems in, at least the L2 cache units 21 and the SC units 24 are described in detail in the incorporated '910 patent application and will not be explained in any more detail than is necessary to convey the invention. Nevertheless, reference is given to FIG. 2 where the relevant structure of one of the storage processing subsystems 22 in the form of an SC0 chip is shown in detail. The understanding is that all other chips in the units 21, 28, and 32 have identical structures. In this regard, the SC0 chip (one of the four storage processing subsystems 26 in an SC unit 21) includes a traffic cop circuit 60 that mediates access to and use of resources within the subsystem 26. Each of the chips in a chipset has its own traffic cop circuit 60. Each traffic cop circuit 60 receives commands from adjacent storage system units via receiving queues and sends command or responses to adjacent storage system units via send queues. Thus, the SC0 chip includes an L20 receiving queue (RECQ) 62 that receives storage system commands via connections with a respective L20 chip 22. The traffic cop 60 considers each command received on the L20 receiving queue 62 and processes it, either executing the command, or forwarding it to another level through a main memory unit (or, an IOSW unit, which is not shown). In executing a command, the traffic cop 60 can issue its own command for an operation to be conducted at a higher level of the hierarchical, multi-level storage system. Commands transferred to higher storage system levels, for example a main memory unit 28, are sent by send queues (such as the SAC0 send queue (SNDQ) 63). Similarly, commands sent down through the storage hierarchy to the SC0 chip are received through receive queues, such as the SAC0 receive queue 65. Commands (and responses to commands) that are lodged in the SAC0 receive queue 65 are considered by the traffic cop circuit 60 and either forwarded to an L20 send queue 66 or processed by the traffic cop 60. In processing commands, the traffic cop 60 may also place commands (or responses to received commands) in the L20 send queue 66.

Figure 2:
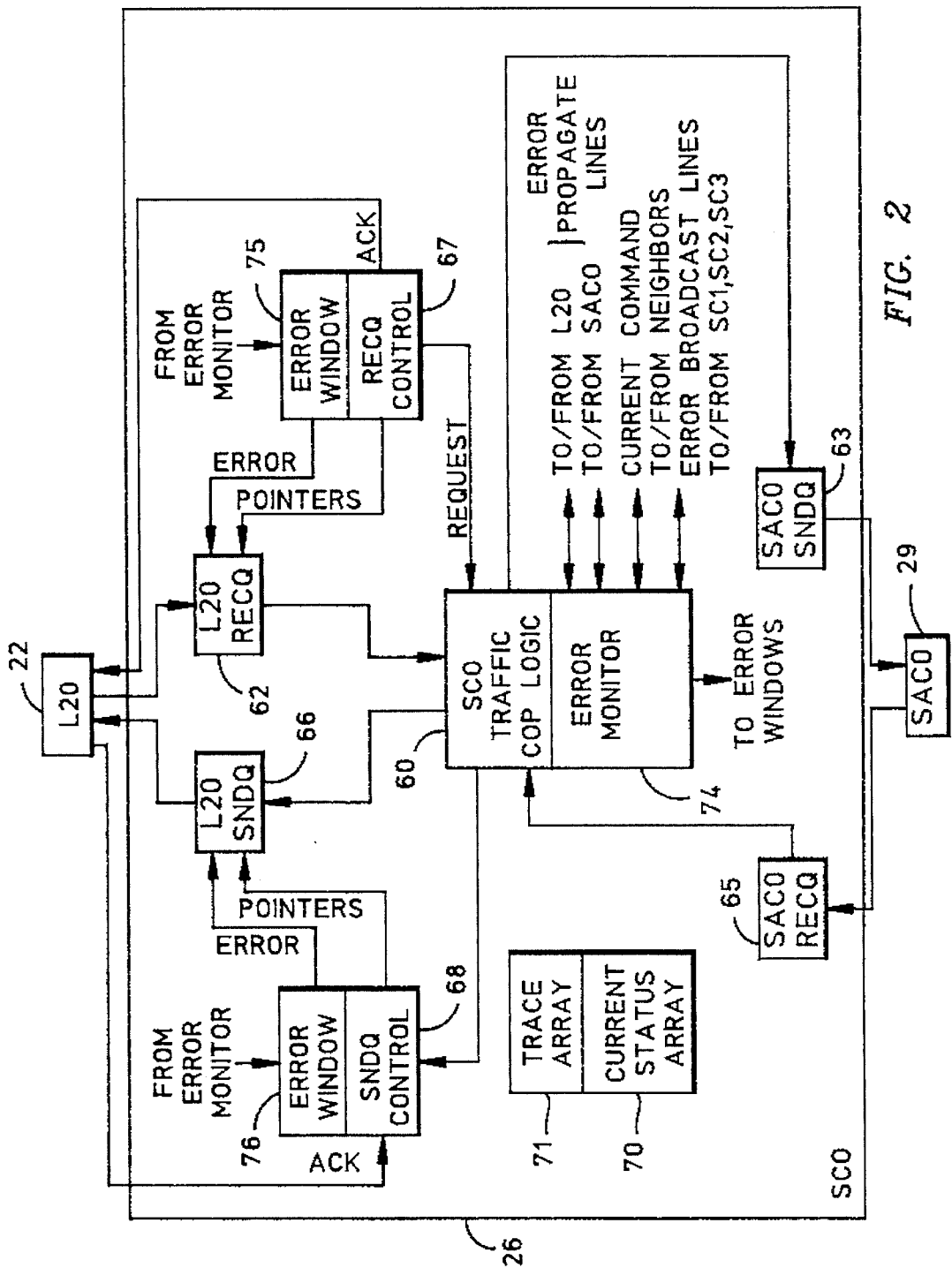
FIG. 2 is a more detailed block diagram of one storage processing subsystem ("chip") of a plurality of storage processing subsystems in one unit of the hierarchical storage system of FIG. 1.

As implied in FIG. 1 and as shown explicitly in FIG. 2, each chip in any respective unit of the hierarchical, multi-level storage system 20 is coupled, for data and command transfer to a corresponding chip at another level of the storage system. Thus, the SC0 chip is coupled to an L20 chip in a respective L2 cache unit 21 of the hierarchical, multi-level storage system 20.

In addition to a traffic cop, each interface includes receive and send queue controls. Thus, in FIG. 2, the SC0 chip has a receive queue control circuit 67 for managing the receive queue 62. In addition, a send queue control circuit 68 is coupled to the L20 send queue 66 for controlling and managing the send queue 66.

Although not shown in FIG. 2, it is asserted that the receive and send queues 63 and 65 also include respective send Q and rec Q control circuits, as do all other send and receive queues on the SC0 chip.

Command transfer across the interfaces in the hierarchical, multi-level storage system 20 is by conventional message passing. Thus, inherent in the queue control circuit for each of the queues 62, 63, 65 and 66 is a message handler (not shown) that conducts message passing with a corresponding message handler in another chip by handshaking protocol. In this regard, when a command is placed in the L20 receive queue 62, the receive queue control logic 67 updates its pointers and returns an acknowledgement to the L20 cache subsystem from which the command was received. The receive queue control logic 67 also returns acknowledgements to SAC0 command sources that provide input to the SAC0 receiving queue 65.

Similarly, send queue control logic 68 updates its pointers in response to acknowledgement from an L20 chip of receipt of a message conveying a command or response from the L20 send queue 66. The send queues control logic (not shown) for the send queue 63 updates pointers for the SAC0 send queue 63 in response to acknowledgement from the SAC0 chip.

In view of its ability to perform processing functions in the SC0 chip, the traffic cop 60 is enabled to maintain a current status array 70 for each block of data currently in the chip. In addition, as the traffic cop 60 executes operations it updates a trace array 71. Trace arrays for storage system elements are known in the art; see, for example, the trace arrays described in the incorporated '466 patent.

In the invention, the traffic cop maintains, in the current status array 70, the current status for each block of data currently being processed by the SC0 chip, maintaining, for each block of data, an identification of the block, the present state of processing the block, and the location of the block in the storage processing subsystem 22.

For each command or response, which is executed in or passed through the SC0 chip the traffic cop 60 executes a sequence of events. As the events occur through the logic of the traffic cop 60 the trace logic maintains a record of the sequence which includes an identification of the command (or response), prior states of the command (or response), in their chronological sequence, the present state of the command (or response), the location of the command (or response) in the SC0 chip, and any interfaces from which the command (or response) was received or to which the command (or response) was provided. The trace of any command (or response) enables the operations performed in the SC0 chip during processing to be restored to a known state for reexecution, if errors occur.

Each chip also includes conventional error monitor and communication logic. In FIG.2, the traffic cop 60 is coupled to error monitor and communication logic 74. The error monitor and communication logic 74 provides error notification to and receives error notification from L20 and SAC0 chips at the L2 and L3 levels of the storage system. The logic 74 also receives a current command or response from a neighboring chip of the three other chips that make up the unit containing the SC0 chip. In addition, the command or response is provided to one of the neighbor chips. The error monitor logic 74 is thus enabled to raise an error indication if a copy of the command or response being executed by the traffic cop 60 differs from the command or response being executed by the neighbor chip. Since all of the chips in the same chipset receive identical commands, error-free operation of the element implies identicality of the current status arrays of the chips at any time during storage system processing. The error monitor logic 74 also conventionally monitors the operations of the SC0 chip to detect errors in chip operation. Detected errors are communicated to the SC1, SC2, and SC3 chips of the chipset containing the SC0 chip. Similarly, the error monitor logic 74 receives error indications from all of the neighbor chips in the chipset containing the SC0 chip.

Each send queue control circuit includes an error window logic 76 for maintaining one or more error windows according to the invention. Each receive queue control circuit includes an error window logic 75 for error processing of receive queue entries according to the invention.

Figure 3:
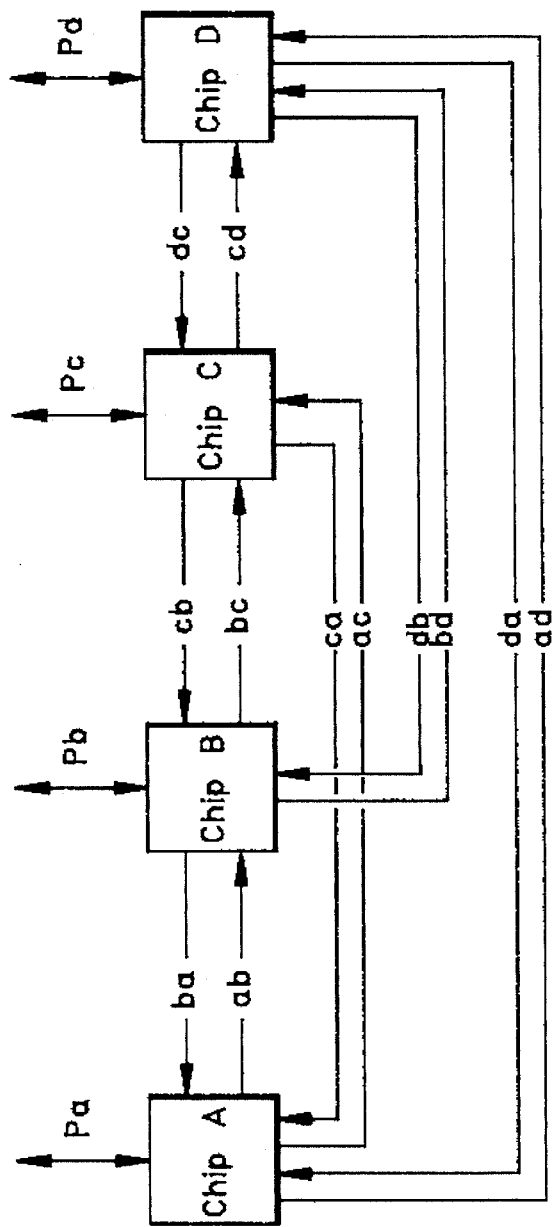
FIG. 3 is a block diagram illustrating how errors are broadcast within and between units of the hierarchical storage system of FIG. 1.

Refer now to FIG. 3 which illustrates how detected machine errors are broadcast in the practice of the invention. In FIG. 3 chip A, chip B, chip C, and chip D comprise a chipset that, together, form a particular storage unit, such as an SC unit 26. In this regard, chips A, B, C, and D would be identical with subsystems 26 (also denoted as chips SC0, SC1, SC2, and SC3 in FIG. 1). It should be understood that FIG. 3 does not limit error broadcasting to just SC2 chips; in fact, in the invention, the L2 chips, the L3 chips, and the IOSW chips are identically configured for error broadcasting.

FIG. 3 establishes an error broadcast network that ensures all chips working together in the storage system remain synchronized. In FIG. 3, propagate lines Pa, Pb, Pc, and Pd signify interface lines at the interface or interfaces that the storage unit containing the chips shares with adjoining units. Thus, Pa would signify, for the SC0 chip in FIG. 1 an interface to an L20 chip, as well as an interface to an SAC0 or a SW0 chip. The broadcast lines signify error communication paths between the individual chips in the unit. Thus, broadcast line bc signifies a communication path to propagate an error indication from chip B to chip C.

The basic timing for error broadcast according to the architecture of FIG. 3 is as follows:

Cycle 1: error detection

Cycle 2: broadcast of error within a chipset in a storage unit.

Cycle 3: broadcast of error across all interfaces that the chipset shares with other chipsets. In this cycle, the chipset quiesces.

Cycle 4: all other chips quiesce.

This timing guarantees that all neighboring chipsets will be informed of an error in the same cycle and will all quiesce in the same cycle. This prevents the neighboring chipsets from losing synchronization with each other.

Following are error detection and broadcast scenarios that exemplify operation of the error broadcast network illustrated in FIG. 3. In these examples, each step represents a cycle; "multiple broadcast" refers to at least two lines seen as active; and, in the case of multiple line faults, the error may not propagate all chips synchronously.

Valid Error on Chip A

1. Chip A detects an internal error and broadcasts it by raising lines ab, ac, ad.

2. Chips B–D acknowledge the broadcast by raising lines ba, bc, bd, ca, cb, cd, da, db, dc.

3. Chips A–D see multiple broadcasts active. Chips A–D quiesce and propagate the error notification to one or more other levels by raising propagate lines Pa, Pb, Pc, and Pd.

Valid Error from Another Level

1. Another level propagates an error notification by raising lines Pa, Pb, Pc, and Pd.

2. Chips A–D broadcast the error among themselves by raising lines ab, ac, ad, ba, bc, bd, ca, cb, cd, da, db, and dc.

3. Chips A–D see multiple broadcasts active. Chips A–D quiesce and propagate the error to the next level by raising lines Pa', Pb', Pc', and Pd'. In this case, Pa' refers to a propagate line coupled to a level other than that which propagated the error notification to the chips of FIG. 3.

No Error, But Broadcast Line ca Faults

1. Broadcast line ca faults.

2. Chip A broadcasts an error notification by raising lines ab, ac, and ad.

3. Chips B–D acknowledge the broadcast by raising lines ba, bc, bd, ca, cb, cd, da, db, and dc.

4. Chips A–D see multiple broadcasts active. Chips A–D quiesce and propagate the error to other level(s) by raising lines Pa, Pb, Pc, and Pd.

No Error, But Propagate Line Pa Faults

1. Propagate line Pa faults.

2. Chip A broadcasts an error notification by raising lines ab, ac, and ad.

3. Chips B–D acknowledge the broadcast by raising lines ba, bc, bd, ca, cb, cd, da, db, and dc.

4. Chips A–D see multiple broadcasts active. Chips A–D quiesce and propagate the error notification to other levels by raising lines Pa, Pb, Pc, and Pd.

The error broadcast network of FIG. 3 guarantees the detection and quiescing of storage system levels in a manner that maintains synchronism between the chips of a unit at any level and between the levels themselves. The network operation guarantees that any errors detected by the hardware on a single chip will be communicated to other chips within the chipset by way of the broadcast lines. The propagate lines will then propagate the errors to other chipsets, or receive error notification from other chipsets.

In the invention, any chipset in a storage system level will start to quiesce within the three to four storage system cycles from error detection. In this regard, when a level quiesces it initiates no new commands. However, the level may take many more cycles for a current operation to complete. Relatedly, current operations will complete only as far as the quiesced level will permit. Therefore, data transferred through the storage system may not be completed. For example, if the traffic cop logic in a set of storage control chips have quiesced data will not go beyond the L2/SC interface.

Figure 4:
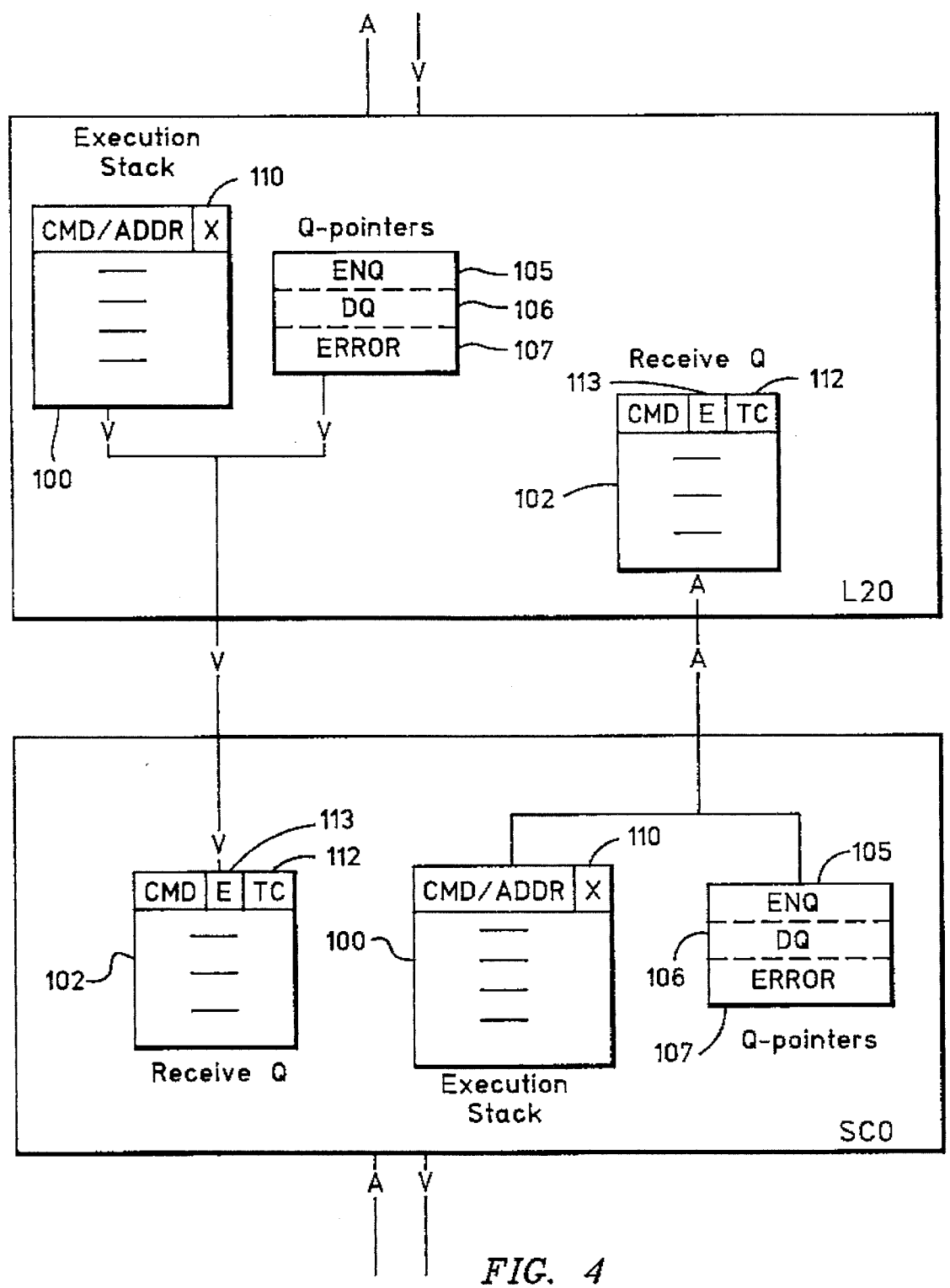
FIG. 4 is a more detailed block diagram showing a queue structure in the storage processing subsystem of FIG. 2.

FIG. 4 illustrates a hardware interface that links an L20 chip to an SC0 chip. Commands, addresses, data and other information are transferred across these interfaces by way of send and receive queues. The interfaces are bi-directional. Therefore, every send and receive queue pair for interface transfer has an inverse twin. This is illustrated in FIG. 4.

In FIG. 4, send queues are represented by execution stacks 100. An execution stack contains, for each entry in a send queue, a pointer to a send queue location where an entry representing the entry is held. The order of the pointers in the execution stacks 100 is the same as the order of the entries in the corresponding send queues. Each send queue is managed by respective send queue logic and error window logic as explained above with respect to FIG. 2. This logic and traffic cop logic have been omitted in FIG. 4 only to simplify the explanation. Each send queue is coupled across the interface to a respective receive queue 102.

When an entry is placed into a receive queue 102, the entry includes the command, address, or data, or other information that is the subject of the entry. For each entry, the receive queue control logic sends a request to the traffic cop logic. In the case of commands (or responses to commands) the entries in the receive queue 102 contain a bit position 112 (TC) that is set when the command (or response) has been forwarded to the traffic cop on the chip for processing. Each command (response) entry in a receive queue also has an error bit field 113 that is set by the receive queue error window logic when the command (response) is received concurrently with an error condition or during an error window. Each receive queue is managed by respective receive queue logic and error window logic as explained above with reference to FIG. 2. This logic is not shown in FIG. 4, in order to simplify the explanation.

Assume that an entry in one of the execution stacks 100 signifying a command in the corresponding send queue is dequeued. In this case, the command will be sent from the send queue across the interface to the corresponding receive queue. A copy of the command will remain in the send queue until the appropriate response has been returned. It is asserted that responses are routed out of storage system of FIG. 1 in precisely the reverse paths that describe their forward progress through the system. Therefore, traffic cop logic that sends a command across an interface will handle the command's response, at which time the queue control logic will remove the command from the queue (and the corresponding pointer from the corresponding execution stack 100).

In the preferred embodiment, the send queue pointers are used to manage an execution stack 100. Thus, in FIG. 4 each execution stack 100 is managed by three pointers: an enqueue (ENQ) pointer 105, a dequeue pointer (DQ) 106, and an Error pointer 107. The pointers 105, 106, 107 keep track of the activity on any given interface. In this regard, the enqueue pointer 105 indicates which queue slot is available for the next in-coming message, the dequeue pointer 106 denotes which send queue entry is to be sent across the interface, and the Error pointer 107 indicates which queue entry is currently being sent across an interface, in which case the entry is deemed "active".

During normal operations, messages containing commands, addresses, data, and other information are passed through the storage system by way of the queue structure illustrated in FIG. 4. As messages are sent from a send queue to the next receive queue, the corresponding execution stack pointers are updated.

Figure 5:
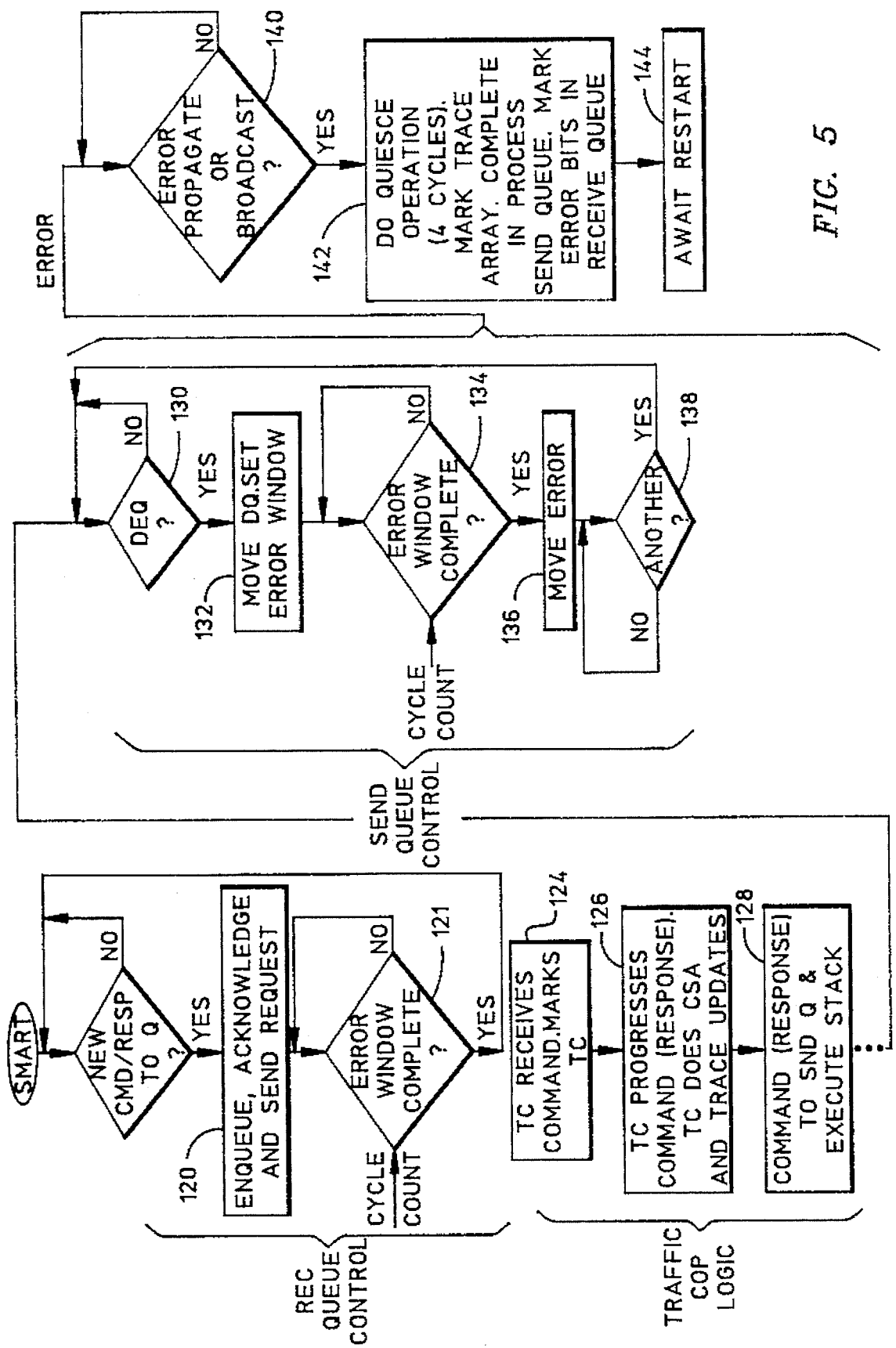
FIG. 5 is a flowchart of an error windowing operation within the hierarchical multi-level storage system of FIG. 1 according to the present invention.

FIG. 5 illustrates how operations of the queue illustrated in FIG. 4 are integrated into the operation of a chip in the practice of the invention. Initially, receive queue control logic (67 in FIG. 2) manages the receive queue, checking for a message including a new command (or response) to place in the receive queue. When such a message is received, the command or response is enqueued at step 119, an acknowledgement is returned to the sender, and the traffic cop logic (TC) on the chip is notified by a request from the receive queue control logic. At the time when the command (response) is enqueued, the receive queue error window logic begins an error window count for the command (response). In this regard, the error window is counted by a storage system cycle count synchronized to the system clock 45. The receive queue error window logic counts the window down in response to the cycle count. When the error window is completed in step 121, the control logic returns to step 119.

With respect to the error window established in step 121, (hereinafter a "receive error window") the error window extends for three cycles, which is one cycle less than the four cycles required for error quiescing described above. Relatedly, the chip receiving the command requires only these three cycles to quiesce itself, if necessary.

The traffic cop logic in step 124 obtains a command (or response) from the receive queue and marks the TC field for the corresponding entry. In step 126, the traffic cop logic processes the command (response) continuously updating the current state array (CSA) and the trace array. As a result of processing done in step 126, the traffic cop logic in step 128 sends a command or response to a send queue and related execution stack.

The send queue control in step 130 waits to dequeue (DEQ) an entry on the send queue pointed to by the DQ pointer. When the entry is dequeued, the send queue control in step 132 moves the DQ pointer to the next entry and sets an error window. In this regard, the error window is counted by the storage system cycle count synchronized to the storage system clock 45. The send queue control in step 134 counts the error window down in response to the cycle count. When the error window has been completed as indicated by the count of cycles set for the error window in step 132 (a "send error window"), the Error pointer is moved to the next entry on the send queue in step 136. If another command (or response) is to be dequeued from the same queue, the send queue control again executes steps 130, 132, 136, returning to step 138.

With respect to the error window established in step 32, each command (or response) requires a respective number of cycles to be transferred across an interface. The error window for any command is one cycle less than the sum of the number of cycles required to transfer a command and the four cycles required for error quiescing described above. Thus, for a command requiring one cycle to transfer across an interface, the error window would be four cycles wide. The error window is set on the cycle following the first cycle for transferring the command and is reset at the end of the error window count.

Manifestly, in the logic just described, the receive queue control, traffic cop logic, and send queue control may be concurrently executing the just-described steps for separate respective commands (or responses). At any time, these parallel processes may be quiesced in response to propagation or broadcast of an error to the chip where they are executing. In this case, these processes are transitioned to the sequence 140, 142, 144. In step 140, if an error is propagated or broadcast to the chip where the processes are performing, the chip traffic cop logic and the relevant queue control logics execute the functions in step 142. In step 142, the traffic cop logic executes a quiesce sequence described above, marks the trace array to indicate the source of the error and completes any in-process dequeue operation for all of the send queues on the chip. Each respective receive queue logic on the chip marks the error bit for any entry in the receive queue it controls if the entry was received concurrently with an error indication, or if the receive error window for the entry is still open. Then, in step 144, the traffic cop logic and all queues await restart processing.

Figure 6:
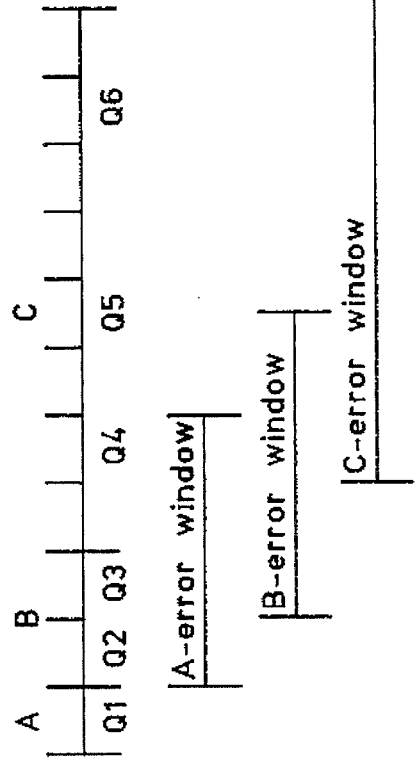
FIG. 6 illustrates a sample error scenario according to the invention.

In the event of an error being detected in the storage system, error conditions are signaled by the detecting unit, broadcast within the unit, and communicated across all interfaces to adjacent units. In this event the entire storage system quiesces as described above. When a quiesce occurs, all execution stack error pointers are frozen and not updated. All enqueue and dequeue pointers for execution stacks are advanced to the last transfer of the current operation. Those send queue entries for which transfer has been initiated will complete their transfers, even if the transfers are multi-cycle. The state of all queue pointers can then be investigated to determine the current state of all of the interfaces within the storage system. This establishes a hardware checkpoint for all storage system interfaces. Given this checkpoint information, the support processor can initiate recovery procedures in which queue pointers are manipulated and reexecute any failing operations in such a manner as to make it appear as though those operations had not been sent across the interface. FIGS. 6 and 7A–7F illustrate an example in which a sequence of commands are received, processed, and transferred across an interface. The letters A, B, and C are queue entries representing commands (or responses) that are evaluated by traffic cop logic, which determines that they are to be sent across an interface through a respective send queue. For convenience, A, B, and C will be referred to as "operations". In FIG. 6, Q1 through Q6 indicate various points in the processing where the storage system might be quiesced. The corresponding send error windows indicate which interface transfer operations would be in error at the respective quiesce points. For example, if the storage system quiesces at Q3, operations A and B are in error. Consequently, according to the recovery mechanism described below, operations A and B must be backed out and reexecuted.

In FIG. 6, operations A, B, and C are transferred across an interface in, respectively, one, two, and eight cycles. Assume that traffic cop logic obtains these operations from a receiving queue in the manner described above and, during processing, determines that they are to be sent to another level of the storage system across an interface. FIG. 6 and FIGS. 7A–7F assume that these three operations have been placed on a send queue; FIGS. 7A–7F show the identified quiesce points while the operations are on a send queue served by the execution stack shown in those figures. Throughout the entire example, it is assumed that the enqueue pointer contains '3' to indicate that slot number 3 is the next available position in the execution stack (or, send queue). It is assumed that no new operations are being placed on the send queue in order to simplify the example; therefore, the value contained in the enqueue pointer will remain a constant '3'. This pointer will not be shown in FIGS. 7A–7B.

Figure 7A:
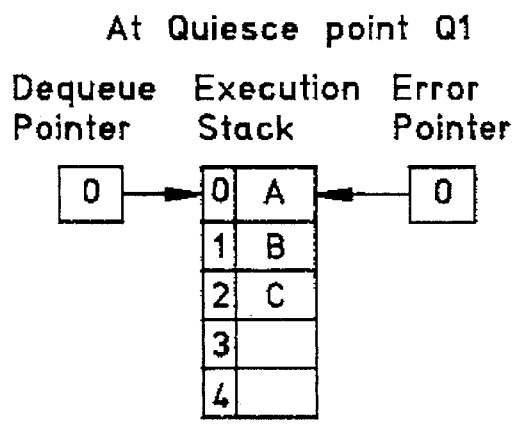
FIGS. 7A–7F illustrate how queue pointers are updated during the error windowing process illustrated in FIG. 5.

With reference to FIGS. 6 and 7A, assume at Q1, that the transfer of operation A across the interface has just been initiated, as indicated by both the dequeue and error pointers. If the storage system quiesced at this point, the transfer of operation A would be reexecuted.

Figure 7B:
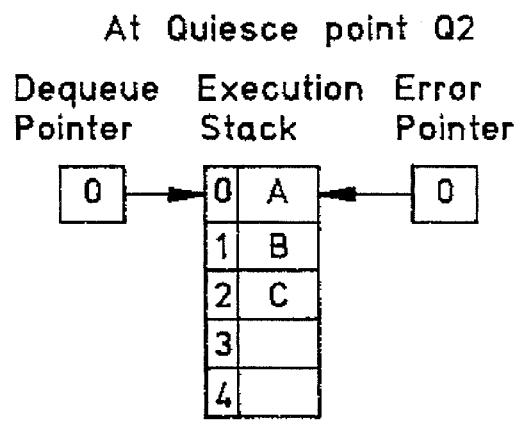

In FIG. 7B, the execution scenario assumes no quiesce at Q1 but that a quiesce occurs at Q2. At Q2, the single cycle required to transfer operation A has completed, however, as required by the invention, the error window for operation A will not close for four more cycles. Therefore, a system quiesce at Q2 will result in a roll back of operation A and a transfer again across the interface after restart. It is pointed out that the dequeue pointer still points to operation A in the execution stack. This results from the fact that an acknowledgement, from the receiving chip, which is required to increment the pointer, is sent in the cycle following completion of the transfer. Since a quiesce occurs in this cycle, the dequeue pointer is not incremented. On the receive queue of the receiving chip, the error bit will be set for operation A.

Figure 7C:
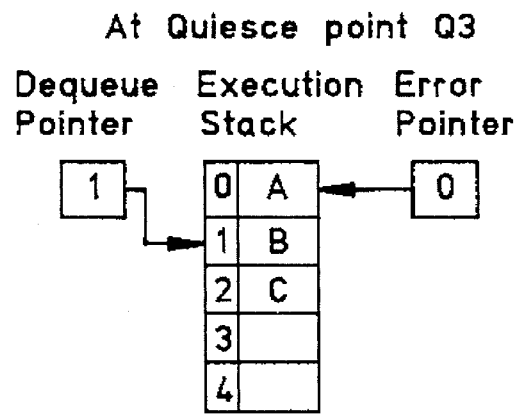

In FIG. 7C, assuming no quiesce prior to Q3, operation A has been transferred across the interface. Acknowledgement of the transfer has incremented the dequeue pointer and operation B has entered the transfer process flow and must be considered if an error occurs. However, the send error window for the transfer of operation A has not closed and the error pointer has not yet been updated. It is pointed out with reference to FIG. 7C that the distance between the error pointer and the dequeue pointer defines the two operations (transfer requests A and B) that must be backed out if an error occurs. At this point operation A and B will have had error bits set in the receiving chip.

Figure 7D:
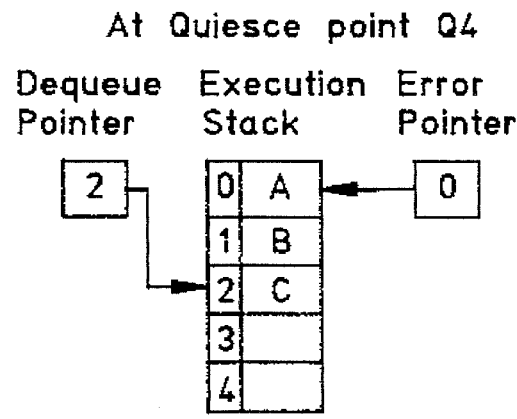

As shown in FIG. 7D, at quiesce point Q4, the error windows for transfer of operation A, B, and C have opened as may be inferred by the difference between the error pointer and the dequeue pointer. In this case, all three operations would have to be backed out and the sequence would have to be executed again during restart. On the receiving chip, all of the operations will have their error bits set.

Figure 7E:
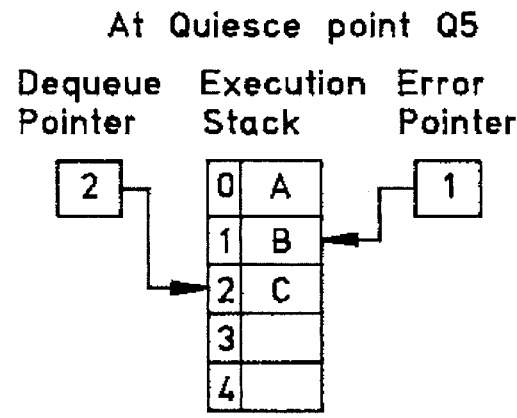

In FIG. 7E, the error window for transfer of operation A has closed, the error pointer is incremented, and the transfer of operations B and C would have to be reexecuted. On the receive queue to which operations A, B, and C have been transferred, operations B and C will have set error bits. However, the three-cycle receive error window for operation A will have closed and the error bit for this operation will not be set. During restart, operation A will not be reexecuted at the sending chip.

Figure 7F:
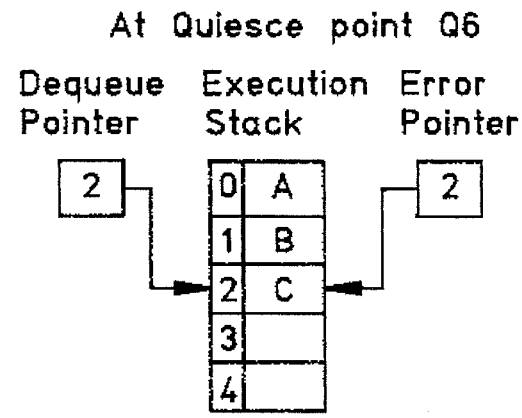

In FIG. 7F, the error window for transfer of operation B is closed, and only the transfer of operation C would have to be backed out and repeated. Both operations A and B would be executed by the receiving chip at restart.

After any error has occurred and the storage system has quiesced, the error analysis and recovery routines will restore the dequeue pointer to the same value that is in the error pointer. This will result in all of the failing operations being reexecuted by the execution stack (sending queue).

As described, during quiescence of a chip, those sending queue dequeuing operations which have commenced and must be completed will result in receive queue entries marked as having failed. Any receive queue entries so marked will be marked with error bits, will not be acted upon and are cleared during recovery. Once recovery is completed, the storage system's quiesced state is released and normal operations are resumed.

Storage System Recovery

As explained above, recovery from interface failure is achieved by manipulation of receive queue error bits and send queue pointers, while control recovery is supported by the use of redundant hardware and control structures in a unit.

The invention contemplates the data recovery as realized by the queuing and interface transfer protection described above. In this regard, the only information not duplicated across the four chips of any unit is data (during data transfer operations). However, data errors can be recovered by accessing the last known good copy of the data that is available in a queue in a previous level of the storage system. As data is transferred from one storage system unit to the next, it is always kept in the previous (source) unit until the destination unit has received all of the data without any errors being detected. In this regard, receive data is subjected to well-known error correction techniques and any non-correctable errors will cause a chip to quiesce.

Once an error has been detected in the storage system, recovery processing is implemented by the support processor (denoted by reference numeral 50 in FIG. 1). The support processor 50 conventionally monitors all error lines in the storage system, setting appropriate machine check flags to indicate the precise location of a hardware error, while the hardware initiates a quiesce of the storage system as previously described.

The recovery scenarios described below involve communication between chipsets in two different units (for example, chips L20, L21, L22, and L23 may constitute one chipset, while chips SC0, SC1, SC2, and SC3 constitute another chipset, and so on). These scenarios also contemplate initial communication within each chipset.

Two general failure scenarios emerge for the storage system described above. First, an inter-chipset error may be detected as indicated by one or more of the propagate lines illustrated in FIG. 3. These are errors that cross the interfaces between respective chipsets (for example from L2-to-SC, or from SC-to-SAC). The second is an intrachip error detected on the broadcast lines of a chipset such as is illustrated in FIG. 3. These are errors that cross the boundaries between chips within the same chipset.

It is asserted that a "failing chip" within a chipset is identified by the support processor with an index value ranging from 0–3.

Figure 8A:
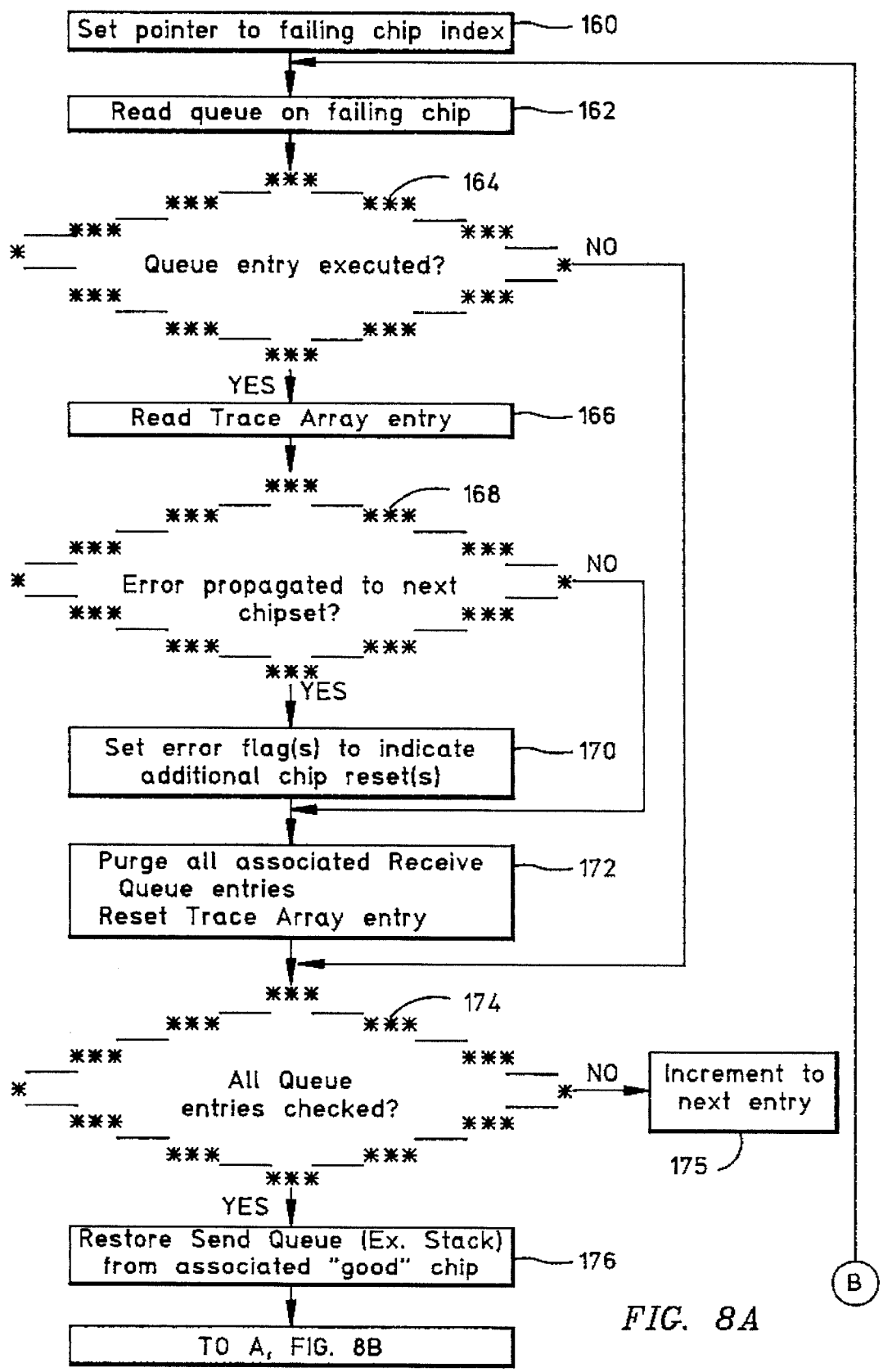
FIGS. 8A and 8B form a flowchart of an inter-chip recovery process within the storage system of FIG. 1 according to the present invention.
Figure 8B:
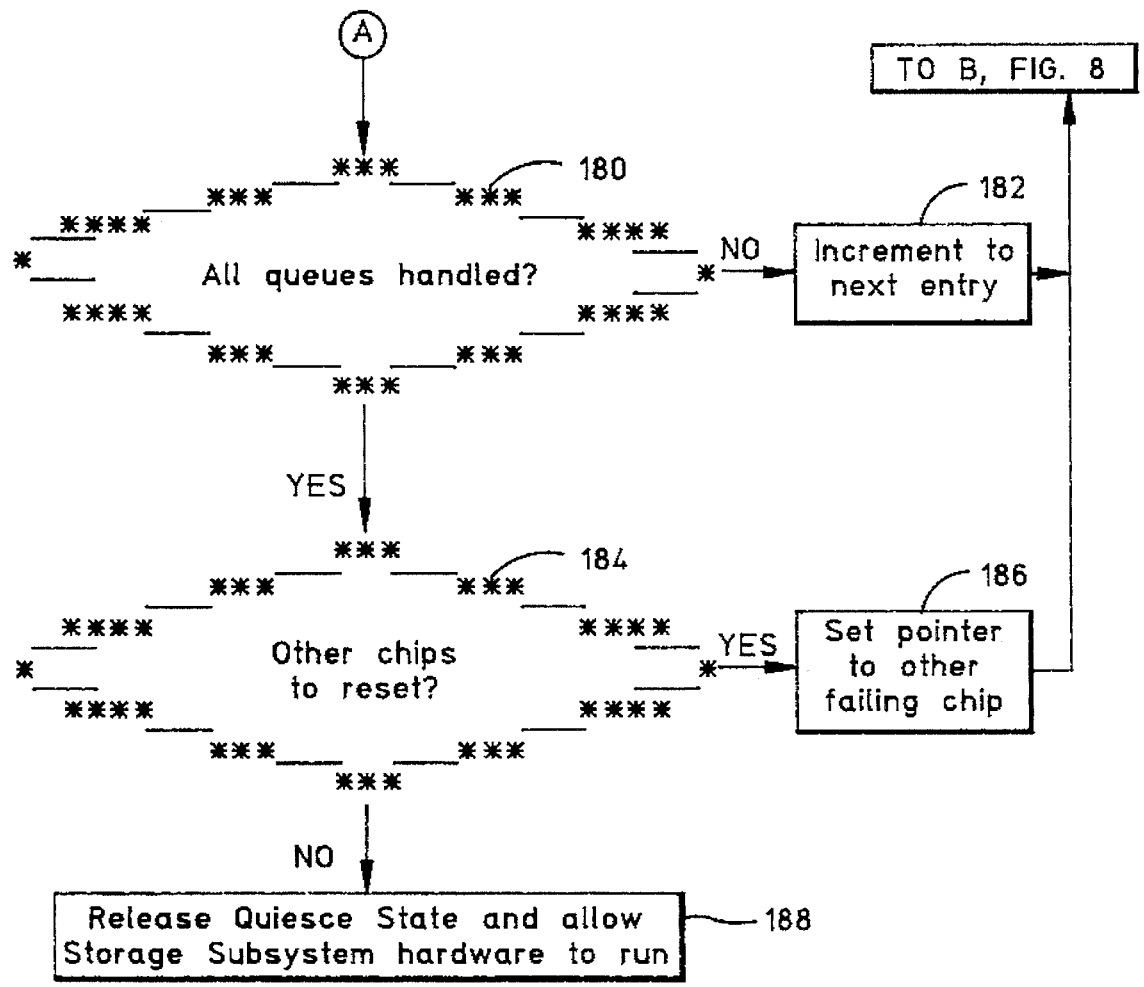

FIGS. 8A and 8B form a flowchart illustrating the interchip failure/recovery scenario. The flowchart conventionally describes the logic and functions of a software or microcoded mechanism that recovers the storage system of FIG. 1 from an interchip failure mode. In this regard, there are essentially three possible error scenarios and associated recovery schemes that are covered by the code. First, the trace arrays for the chips of a storage unit may indicate no errors in chip operations, but there is an error on the interface between the storage units. Second, the trace arrays in the set of chips in one unit may indicate no error, but the trace arrays in the other storage unit indicate an error. Last, the trace arrays in both storage units may indicate an error in both chipsets.

The interchip recovery logic initially sets the index value (0–3) to identify a "failing chip" indicated by an error flag available to the support processor. In step 162, the receive queues on the chip indicated by the index are read, entry-by-entry. For each entry on a receive queue, the tc field is checked in decision 164 to determine whether the entry has been executed by the traffic cop. If not, the negative exit is taken from decision 164. If the entry has been executed, the trace array is read in step 166. The trace array indicates all events which have occurred for the receive queue entry. If the trace array indicates an error during execution and propagation of the entry through a send queue to the next chipset, the positive exit is taken from decision 168 and, in steps 170, an error flag is set to indicate that the next chip across an interface to which the error was propagated will be analyzed. The negative exit from decision 168 joins the process flow at the input to step 172. In step 172, the receive queues of the indexed chip are purged of all entries that have been executed by traffic cop logic and the trace array contents for those entries are deleted from the trace array. In step 174, the entries of all receive queues on the chip have been checked, and the positive exit is taken; otherwise, the process increments to the next receive queue entry in the just described process is executed for that entry. When all entries for the current receive queue have been processed, all send queue entries resulting from entries purged from the receive queue are restored by copying the corresponding entries from a nonfailing chip in the storage unit in step 176. Steps 180 and 182 permit the process to index through all receive queues on the indexed chip. Steps 184 and 186 index along the paths of failed entries to recover other chips affected by propagation of errors across other interfaces in the storage subsystem. When all of the propagation errors have been tracked and all affected chips recovered, the support processor releases the quiesced state of the storage system and issues a single Restart command to begin the system running.

As an example refer to FIG. 7E. The recovery analysis would determine that the send error window for operation A is closed while operations B and C are both "active" at the time of failure (i.e. when the subsystem was quiesced). Information contained in the trace arrays of the sending chip as well as the current states of the execution stack pointers of the sending chip and the receive queue error bits in the receiving chip would reveal this information. During recovery, operations in order to reexecute the failing operations the operations are purged from the receive queue in the receiving chip, while in the sending chips dequeue pointer would be set back to "1" and the Error pointer would be left at "1" also. This would cause the operation B to be reexecuted upon subsystem restart. At this time the send error window for operation B would also be opened. The hardware then proceeds as its operation A is already complete (which it is) and will eventually restart operation C as if it had never been initiated.

During restart, advantage is taken of subsystem duplication in the various storage system units described above. The multiple copies of chips in any unit retain duplicate copies of all control information and commands across the set of chips in the unit. If quiesce occurs because of an error detected in one of the four chips as a result of defective control information or command, the chip can be reinitiated by copying the control information and command from any one of the nonfailing chips of the unit. Since error detection at the unit level verifies that all four chips in any unit are performing the same operation at the same time, the chips will be maintained in synchronization during normal hardware operation. Loss of synchronization because of an error in control information or command at any one chip will quiesce the unit and the storage system and the chips will be resynchronized by copying accurate control information and commands to the chip from which the error arose.

Thus, following quiescence of the storage system, if the support processor determines upon analysis of the error flags that the failure mode is intrachip and that the error did not affect any storage units coupled to the unit with the failing chip, the storage processor takes advantage of the redundant hardware inherent in the unit with the failing chip to implement a simple procedure to handle the recovery. The procedure is represented in the following pseudocode table:
INTRA-chip Recovery Pseudocode DO for all chips implicated by error flag(s)
        Set pointers to failing chip index indicated by machine check
        Reset control hardware on the failing chip
        Select one of the "good" chips within the same chipset
        Copy control information to set failing chip "in sync" with the reset of the chipset
        Release Quiesce State and allow hardware to run
    ENDDO Manifestly, the recovery procedures illustrated in FIGS. 8A and 8B and described in the pseudocode for intrachip recovery may be embodied in one or more software programs comprising coded instructions compiled and executed by a processor acting as service processor (SP) 50 of FIG. 1. These procedures may also be implemented in one or more microcoded routines. Therefore, the invention may be embodied in the form of a program product that comprises a recordable storage medium having recorded on it one or more software programs or routines with coded instructions that, when installed, compiled, and executed perform the methods illustrated in FIGS. 8A/8B and in the above pseudocode table. In all recovery scenarios the error windowing mechanisms implemented in hardware, and previously described, are used by the recovery code to identify and recover all failing operations.

These and other extensions of the invention may be made without departing from the spirit and scope thereof as recited in the appended claims.

We claim:

1. A hierarchical, multi-level storage system, comprising:

a plurality of first level cache subsystems for storing data or instructions of respective processing units and for passing storage access commands from the processing units:

a higher level storage system containing data or instructions of the plurality of first level cache subsystems and providing data or instructions to the first level cache systems in response to storage access commands;

the higher level storage system including one or more system levels;

each system level including one or more units, each unit including a plurality of parallel storage processing subsystems, each storage processing subsystem coupled to receive a respective copy of an entire storage access command from an adjacent unit;

for each storage processing subsystem, a queue assembly to record a status of said storage processing subsystem in performance of the storage access commands;

error means for detecting and broadcasting storage subsystem errors;

each plurality of storage processing subsystems in any unit quiescing in response to broadcast of a storage system error; and means in each storage processing subsystem of each plurality of storage processing subsystems responsive to broadcast of a storage system error for referencing the queue assemblies and resetting the corresponding storage processing subsystems to a state preceding occurrence of the error, said state being common to all storage processing; subsystems of the plurality of storage processing subsystems in the unit.

2. A hierarchical, multi-level storage system, comprising:

a plurality of first level cache subsystems for storing data or instructions of respective processing units and for passing storage access commands from the processing units:

a higher level storage system containing data or instructions of the plurality of first level cache subsystems and providing data or instructions to the first level cache systems in response to storage access commands;

said higher level storage system including one or more system levels, each system level including one or more units, each unit including a plurality of parallel storage processing subsystems, each storage processing subsystem sequentially processing respective copies of entire storage access commands received from an adjacent unit;

for each storage processing subsystem, a trace array identifying commands completed by said storage processing subsystem and whether an error occurred in each identified completed command;

an error monitor to detect errors in the storage system and responsively broadcast the error to all storage processing subsystems; and a support processor responsive to broadcast of an error to quiesce the storage processing subsystem, sequentially reverse the storage processing subsystem to a checkpoint that is common to all storage processing subsystems of the plurality of storage processing subsystems in the unit, and to restart each subsystem of a plurality of subsystems from the common checkpoint.

3. A method for operating a storage system that includes at least one level, wherein each level includes multiple storage units and each storage unit includes a plurality of storage processing subsystems, said method comprising the steps of:

transmitting data and commands to a first one of the at least one level;

each storage processing subsystem in the first level receiving all commands and a selected portion of the data;

for each storage processing subsystem in the first level, maintaining a trace array identifying commands completed by said storage processing subsystem and whether an error occurred in each of identified completed commands;

detecting an error occurring in the storage system and in response thereto broadcasting the error to all storage processing subsystems;

in each storage processing subsystem, maintaining a trace array identifying commands being processed in that storage processing subsystem at the time of error detection;

ascertaining a location of the error;

if the error occurred in control information of a storage processing subsystem of a storage unit, correcting said storage processing subsystem with the error by obtaining correct control information from another storage processing subsystem of said storage unit;

if the error occurred in an interface between storage units, consulting trace arrays to ascertain a state of the storage units at error detection and adjusting the states of the storage units to a point prior to where the error occurred; and retransmitting at least one command that was being transferred when the error occurred.

4. The method of claim 3, further comprising the steps of issuing a restart command causing each storage unit to restart operations with synchronicity between storage processing subsystems of each level, and with synchronism between each of the levels.

* * * * *